United States Patent [19]

Stiehler

[11] Patent Number: 5,603,069
[45] Date of Patent: Feb. 11, 1997

[54] METERED FILM HOLDING DEVICE TO PREVENT FILM MOVEMENT IN CAMERA

[75] Inventor: Wayne E. Stiehler, Spencerport, N.Y.

[73] Assignee: Eastman Kodak Company, Rochester, N.Y.

[21] Appl. No.: 608,026

[22] Filed: Mar. 4, 1996

[51] Int. Cl.$^6$ .................................................. G03B 1/00
[52] U.S. Cl. ........................................... 396/397; 396/440
[58] Field of Search .................................. 354/217, 218, 354/203, 213

[56] References Cited

U.S. PATENT DOCUMENTS

| | | | |
|---|---|---|---|
| 3,712,200 | 1/1973 | Beach | 95/31 FM |
| 3,724,348 | 4/1973 | Monks | 95/31 R |
| 3,871,012 | 3/1975 | Haraguchi | 354/246 |
| 4,401,376 | 8/1983 | Pomazi | 354/173.1 |
| 4,417,793 | 11/1983 | Oyokota et al. | 354/21 |
| 4,780,734 | 10/1988 | Ogawa et al. | 354/173.11 |
| 4,914,462 | 4/1990 | Pagano | 354/213 |
| 5,023,640 | 6/1991 | Diehl | 354/173.1 |

*Primary Examiner*—Safet Metjahic
*Assistant Examiner*—Eddie C. Lee
*Attorney, Agent, or Firm*—Roger A. Fields

[57] ABSTRACT

A metered film holding device in a camera comprising a metered film holding element supported to enter a film perforation in a metered filmstrip to substantially prevent unintended movement of the filmstrip, is characterized in that the metered film holding element is a ball supported to roll in place continuously in contact with the filmstrip when the filmstrip is advanced in the camera. The ball has a diameter greater than a maximum dimension of the film perforation in order to be able to roll only partly into the film perforation.

2 Claims, 4 Drawing Sheets

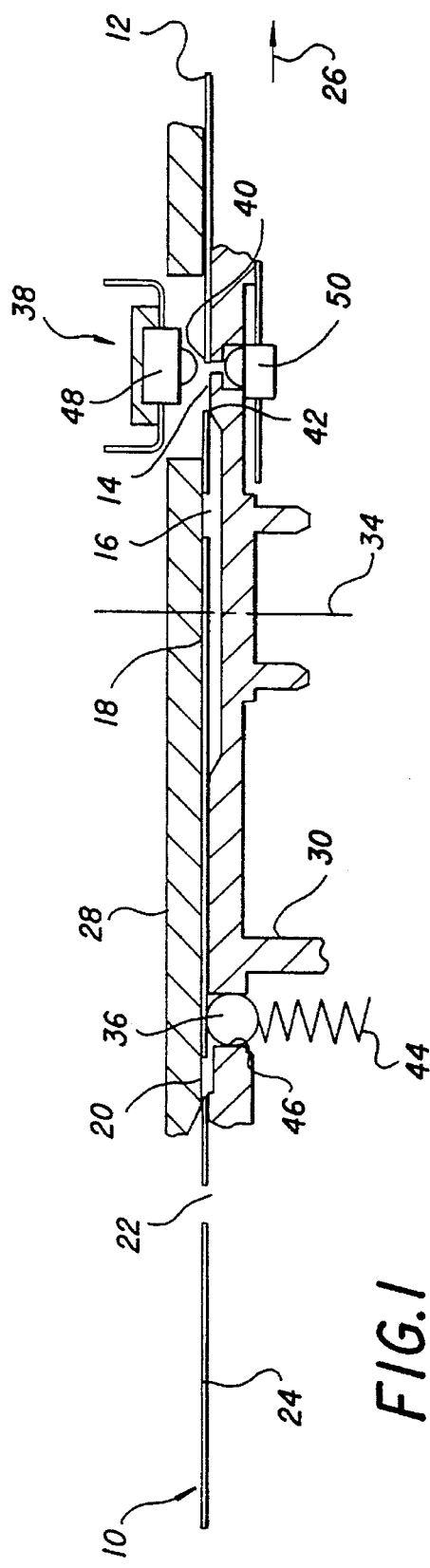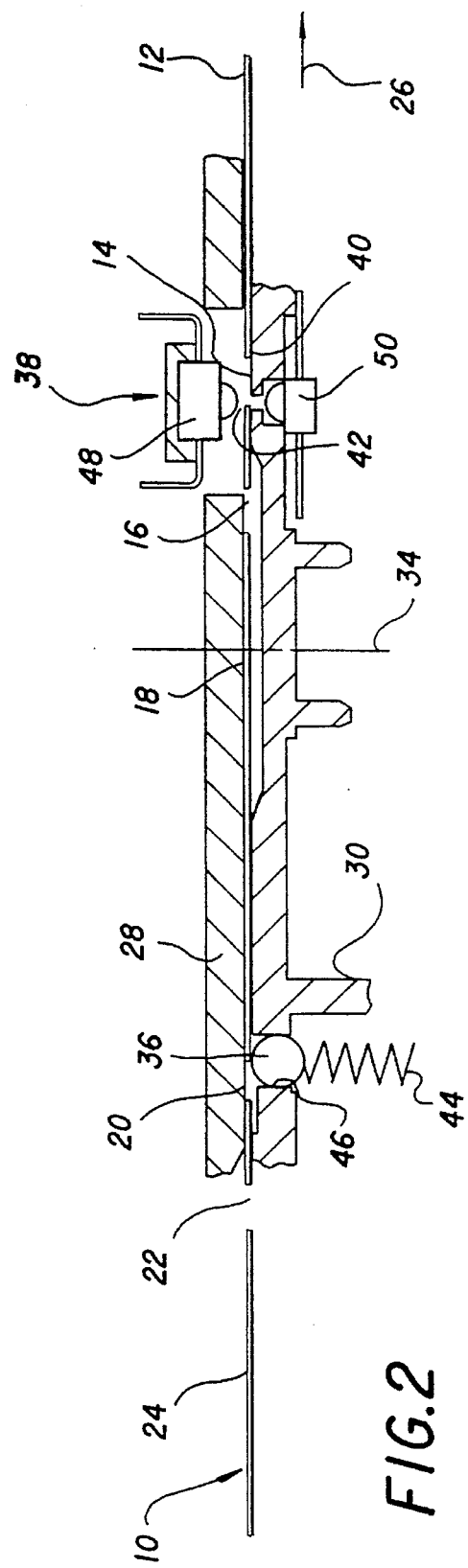

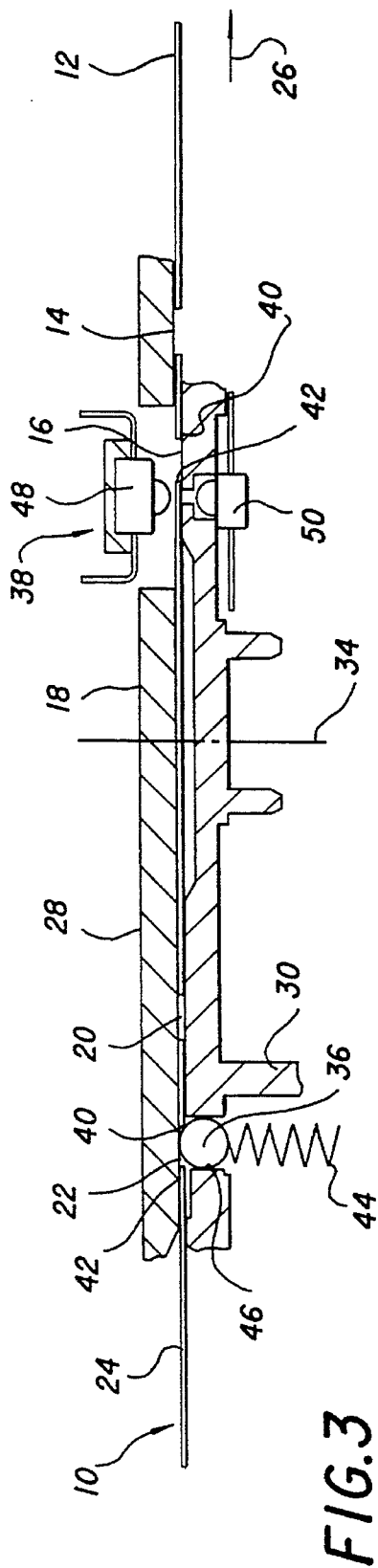
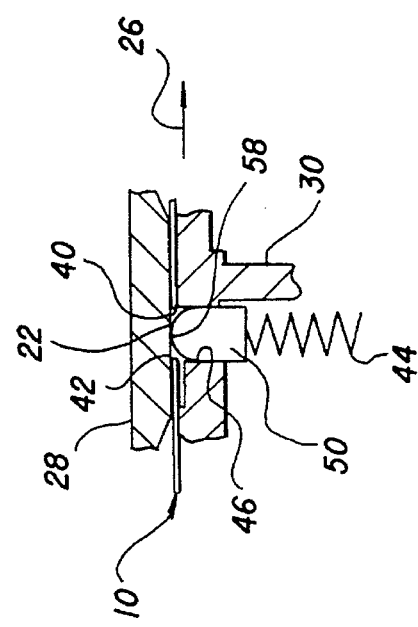
FIG. 3
FIG. 7

METERED FILM HOLDING DEVICE TO PREVENT FILM MOVEMENT IN CAMERA

CROSS REFERENCE TO RELATED APPLICATION

Reference is made to and priority claimed from U.S. Provisional application Ser. No. 60/000,532, filed Jun. 28, 1995, entitled METERED FILM HOLDING DEVICE TO PREVENT FILM MOVEMENT IN CAMERA.

Reference is made to commonly assigned copending application Ser. No. 08/456,442 [our Docket No. 71029/ DAH], entitled BRAKE POINT METERING and filed Jun. 1, 1995 in the name of Peter A. Newman.

The cross-referenced application is incorporated in this application.

1. Field of the Invention

The invention relates generally to the field of photography, and in particular to a metered film holding device for preventing unintended film movement in a camera, for example during picture-taking.

2. Background of the Invention

A filmstrip in a camera is advanced one frame at a time for exposure. Typically, as disclosed in U.S. Pat. No. 3,724,348, granted Apr. 3, 1973, a spring-urged sensing pawl enters one of the perforations in the filmstrip to disable the film advance mechanism of the camera. Each time the film advance mechanism is disabled, the filmstrip is said to be "metered" or positioned for exposure.

It is often a problem to hold the metered filmstrip completely in place, particularly during exposure. For this reason, there may be provided a metered film holding element which in the example of U.S. Pat. No. 3,724,348 is a second pawl that enters the same perforation as the sensing pawl.

A difficulty with the two pawl approach suggested in U.S. Pat. No. 3,724,348 is that a pawl is not readily dislodged from a film perforation when the filmstrip is advanced.

SUMMARY OF THE INVENTION

A metered film holding device in a camera comprising a metered film holding element supported to enter a film perforation in a metered filmstrip to substantially prevent unintended movement of the filmstrip, is characterized in that:

the metered film holding element is curved to have a diameter greater than a maximum dimension of the film perforation in order to be able to only partly enter the film perforation; and a spring resiliently biases the metered film holding element against the filmstrip to urge the metered film holding element to enter the film perforation.

More specifically, the metered film holding element is a ball supported to roll in contact with the filmstrip when the filmstrip is advanced in the camera.

The roundness of the metered film holding element, as in the case of a ball, permits the metered film holding element to be readily dislodged from a film perforation when the filmstrip is advanced. However, the spring bias of the ball against the filmstrip is sufficient to maintain the ball in the film perforation to prevent unintended film movement due to a shock or vibration, for example.

BRIEF DESCRIPTION OF THE DRAWINGS

FIG. 1 is a sectional view of a film metering component of a camera according to a preferred embodiment of the invention, showing an optical sensor sensing the leading edge of a first anticipation perforation in a filmstrip and a metered film holding ball rolling in place in contact with the filmstrip when the filmstrip is advanced;

FIG. 2 is a sectional view similar to FIG. 1, showing the optical sensor sensing the trailing edge of the first anticipation perforation and the ball about to enter a second anticipation perforation in the filmstrip as the filmstrip is advanced;

FIG. 3 is a sectional view similar to FIG. 1, showing the optical sensor after having sensed the trailing edge of a first metering perforation in the filmstrip, following the first anticipation perforation, and the ball in a second metering perforation in the filmstrip, following the second anticipation perforation, to hold the filmstrip metered;

FIG. 7 is an alternate embodiment in place of the metered film holding ball.

DETAILED DESCRIPTION OF THE INVENTION

Figure 6:
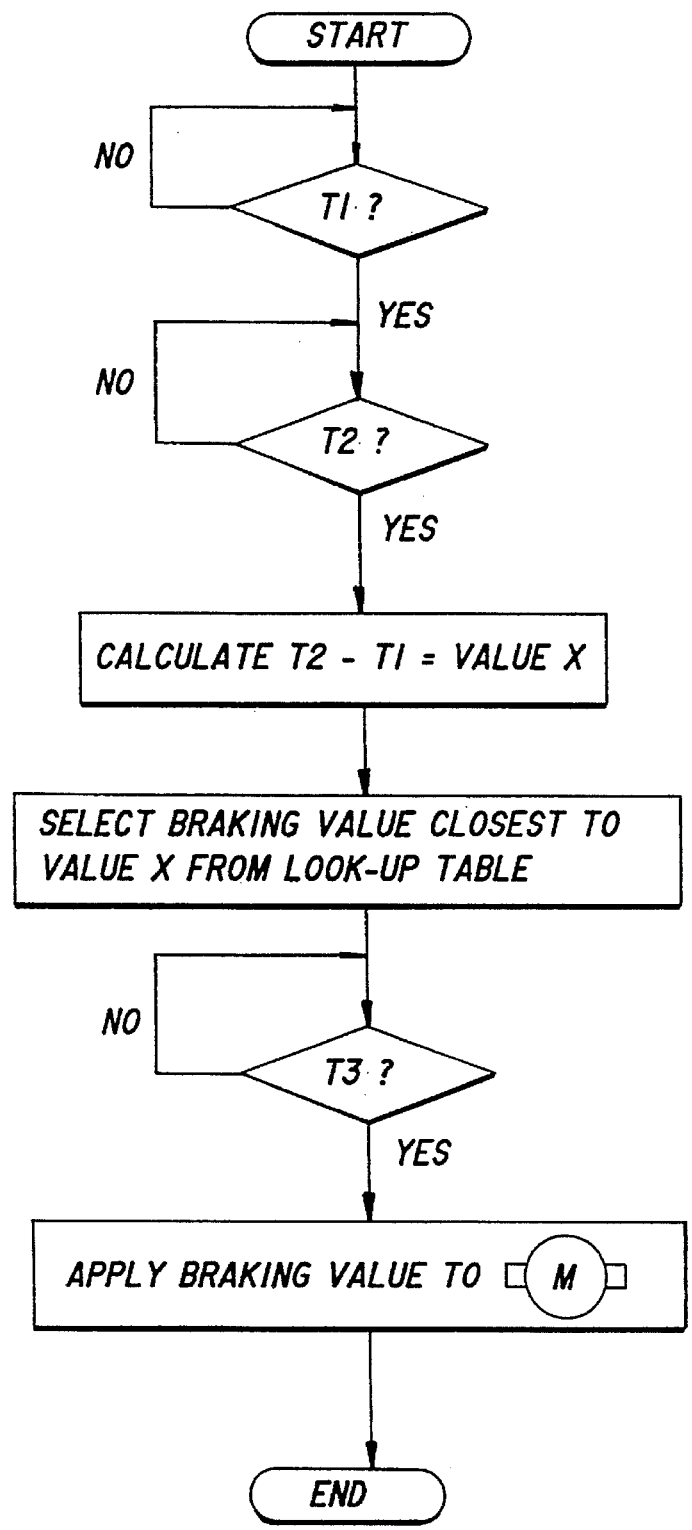
FIG. 6 is a flow diagram for braking the motor to meter the filmstrip.

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIG. 1 depicts an unexposed filmstrip 10 having successive pairs of identical anticipation and metering perforations for respective film frames. Specifically, FIG. 1 shows from right to left an exposed frame 12, a pair of first anticipation and metering perforations 14 and 16, a first unexposed frame 18, a pair of second anticipation and metering perforations 20 and 22, and a second unexposed frame 24. The filmstrip 10 is intended to be advanced via known means in a camera from left to right in FIG. 1 as indicated by the directional arrow 26. As shown, the filmstrip 10 is advanced between a rear platen 28 of the camera and a body part 30 of the camera which defines an exposure chamber 32 centered about the optical axis 34 of a taking lens (not shown).

A film metering component of the camera comprises a metered film holding ball 36 which has a diameter greater than the maximum dimension of the identical anticipation and metering perforations 14, 16, 20, 22 in order to be able to fit only part way into the respective perforations, and an optical sensor 38 for sensing the leading and trailing edges 40 and 42 of the respective perforations. The "maximum dimension" is the distance between the leading and trailing edges 40 and 42 of the respective perforations.

The metered film holding ball 36 is urged via a helical compression spring 44 perpendicularly towards the filmstrip 10. This permits the ball 36 to roll in place within an opening 46 in the body part 30 continuously in contact with the filmstrip 10 as the filmstrip is advanced in the direction 26.

Figure 5:
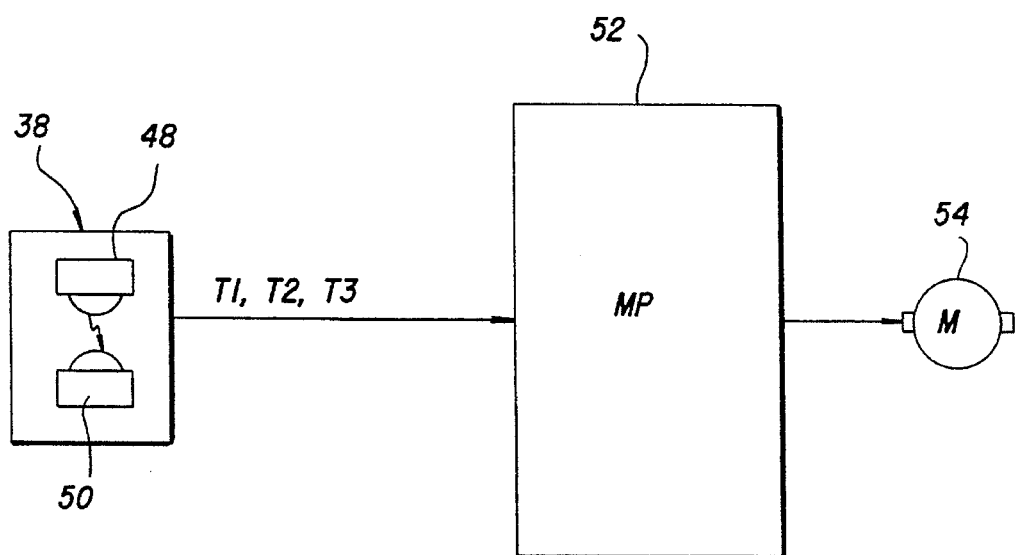
FIG. 5 is block diagram of the optical sensor, a microprocessor, and a drive motor for advancing the filmstrip.

The optical sensor 38 includes a known light emitter 48 and detector 50 which are connected to a known microprocessor 52 in the camera. See FIG. 5.

Figure 4:
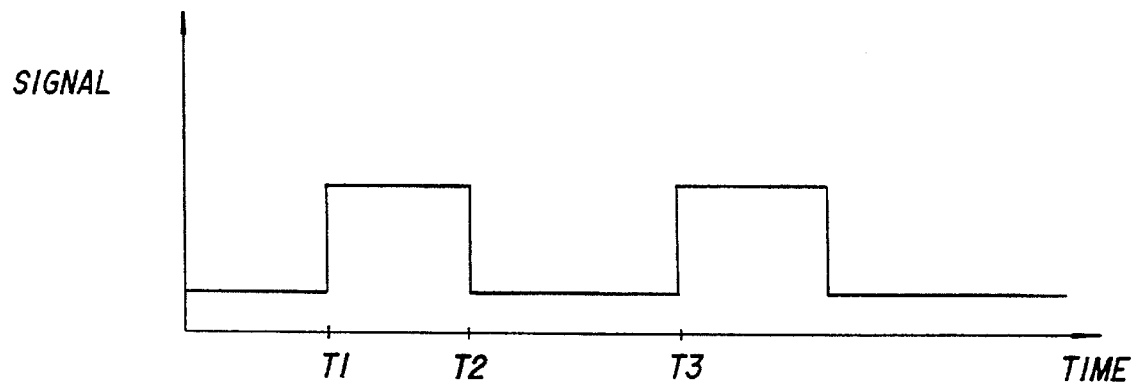
FIG. 4 is a schematic time vs. signal representation of the optical sensor as the optical sensor successively senses the leading and trailing edges of the first anticipation perforation and the leading edge of the first metering perforation when the filmstrip is advanced.

Beginning with FIG. 1, the optical sensor 38 senses the leading edge 40 of the first anticipation perforation 14 at the time T1, producing an output signal as shown in FIG. 4 which is inputted to the microprocessor 52. At the same time, the ball 36 rolls in contact with the filmstrip 10. In FIG. 2, the optical sensor 38 senses the trailing edge 42 of the first anticipation perforation 14 at the time T2, producing an output signal as shown in FIG. 4 which is inputted to the microprocessor 52. The ball 36 continues to roll in contact with the filmstrip 10. Next, as the filmstrip 10 is further advanced in the direction 26, first the ball 36 rolls into and out of the second anticipation perforation 20 and then the optical sensor 38 senses the leading edge 40 of the first metering perforation 16 at the time T3, producing an output signal as shown in FIG. 4 which is inputted to the microprocessor 52. Finally, as shown in FIG. 3, the filmstrip 10 is advanced until the first metering perforation 16 is moved clear of the optical sensor 38 and the ball 36 enters the second metering perforation 22. At this time, the ball 36 holds the filmstrip metered with the first unexposed frame 18 precisely located in the exposure chamber 32.

FIG. 4 depicts how the microprocessor 52 operates to brake a drive motor 54 to discontinue film movement in order to meter the filmstrip 10. This operation is as follows:

(1) Once the microprocessor 52 first receives the output signal from the optical sensor 38 indicating that the optical sensor has sensed the leading edge 40 of the first anticipation perforation 14 at the time T1, and then receives the output signal from the optical sensor indicating that the optical sensor has sensed the trailing edge 42 of the first anticipation perforation at the time T2, the microprocessor calculates T2 minus T1=a value X.

(2) The microprocessor 52 interrogates a look-up table of braking values for the motor 54, to select a particular value which is closest in match to the value X.

(3) Finally, when the microprocessor 52 receives the output signal from the optical sensor 38 indicating that the optical sensor has sensed the leading edge 40 of the first metering perforation 16 at the time T3, the microprocessor applies the braking value which has been selected to the motor 54 to allow the filmstrip 10 to come to rest substantially coincidental with movement of the ball 36 into the second metering perforation 22.

Alternatively, the drive motor 54 can be braked using the method described in the cross-referenced application.

The invention has been described with reference to a preferred embodiment. However, it will be appreciated that variations and modifications can be effected by a person of ordinary skill in the art without departing from the scope of the invention. For example, FIG. 7 shows a metered film holding pin 56 in place of the metered film holding ball 36. The pin 56 has a curved end 58 with a diameter that is the same as the diameter of the ball 36.

PARTS LIST 10. filmstrip
12. exposed frame
14. first anticipation perforation
16. first metering perforation
18. first unexposed frame
20. second anticipation perforation
22. second metering perforation
24. second unexposed frame
26. direction
28. rear platen
30. body part
32. exposure chamber
34. optical axis
36. ball
38. optical sensor
40. leading perforation edge
42. trailing perforation edge
44. spring
46. opening
48. emitter
50. detector
52. microprocessor
54. motor
56. pin
58. curved end

I claim:

1. A film metering component for a camera comprising a metered film holding element supported to enter respective film perforations in a metered filmstrip to prevent unintended movement of the filmstrip, and a film sensor for sensing the film perforations when the filmstrip is advanced in the camera to locate the respective perforations opposite said film sensor, is characterized in that:

said metered film holding element is a ball supported to roll in place continuously in contact with the filmstrip whenever the filmstrip is advanced in the camera, and having a diameter greater than a maximum dimension of the film perforation in order to be able to roll only partly into the film perforation; and said film sensor is a fixed optical sensor positioned relative to said ball to only allow the ball to enter one of the film perforations when none of the respective perforations are opposite the optical sensor.

2. A metered film holding device in a camera comprising a metered film holding element supported to enter a film perforation in a metered filmstrip to prevent unintended movement of the filmstrip, is characterized in that:

said metered film holding element is a ball supported to roll in place continuously in contact with the filmstrip whenever the filmstrip is advanced in the camera, and having a diameter greater than a maximum dimension of the film perforation in order to be able to roll only partly into the film perforation.

* * * * *